Dec. 25, 1923. 1,478,975
R. B. MATTHEWS
MEANS FOR KEEPING ACCOUNTS AND COMPOSING ACCOUNT BOOKS
Filed Oct. 14, 1921   2 Sheets-Sheet 1

Dec. 25, 1923.

R. B. MATTHEWS 1,478,975

MEANS FOR KEEPING ACCOUNTS AND COMPOSING ACCOUNT BOOKS

Filed Oct. 14, 1921    2 Sheets-Sheet 2

Fig. 3.

Witnesses:
Edward L. Mair
J. M. Smith

INVENTOR:
Richard B. Matthews
By Chatwin & Company
att'ys

Patented Dec. 25, 1923.

1,478,975

UNITED STATES PATENT OFFICE.

RICHARD BORLASE MATTHEWS, OF EAST GRINSTEAD, ENGLAND.

MEANS FOR KEEPING ACCOUNTS AND COMPOSING ACCOUNT BOOKS.

Application filed October 14, 1921. Serial No. 507,772.

*To all whom it may concern:*

Be it known that I, RICHARD BORLASE MATTHEWS, a subject of the King of England, residing at East Grinstead, in the county of Sussex, England, have invented new and useful Improvements Relating to Means for Keeping Accounts and Composing Account Books, of which the following is a specification.

This invention relates to means for keeping accounts and composing compounding or constituting account books or files by the use of prepared saleable written or type-written or printed slips or sheets of paper securable in predetermined defined positions for simplified permanent record on the pages in specially ruled books or specially arranged mechanical files all being carried out by a procedure which is mainly a mechanical process, thus economizing time, labour and mental effort, whilst also ensuring accuracy.

Usually the entry of an account, is accomplished by writing in an account book by hand, and then copying from this book, into other books, ledgers and the like (with liability to error in the course of transcription). Before writing in an entry in any book a mental decision has to be made as to whether it is a debit or a credit—this affords another source of error.

According to this invention separate entries are made upon slips or sheets of paper (forming, for convenience in handling, a cutting from or portion of a continuous sales strip for example) by aid of handwriting, by aid of a typewriter or by aid of an adding machine or book-keeping machine. At the same time, several copies of each slip are produced by ordinarily duplicating preferably though not necessarily on differently coloured slips. Or in the case of an adding machine or book-keeping machine, the machine can be so modified as to produce the required number of printings on the same or several slips.

These slips are then detached from their respective continuous strips and manually or mechanically affixed in their defined positions in the specially ruled account books and ledgers. The account books and ledgers are specially ruled with spaces for the reception of these slips, and the columns are appropriately marked at the top, so that the slips can only be correctly placed in their proper positions; and therefore there is no need for the book-keeper to exercise any mental effort to decide whether an entry should be a debit or a credit. All that has to be done, is to see that the markings on the slips correspond to the markings on the pages of the account books. These markings may consist of a letter or a group of letters or a figure or figures, or any selected special signs, symbols or marks. These markings of course differ with the class of account to be dealt with, and are predetermined. Six or seven such groups of markings usually suffice for ordinary book-keeping by double-entry or any other efficient system, as there are only this number of general classes of account, viz:—(1) invoices received for bought goods, and (2) invoices sent out for sold good; (3) cash received in payment for sold goods and (4) cash or cheques drawn or paid out on account of credit or bought goods transactions; (5) petty cash received and (6) petty cash paid out for small cash sales and purchases; (7) transfers from one department to another department (internally); or the equivalent or modifications of these under other titles in accordance with local custom or special requirements. Hence the selection of the correct marking is an easy matter, for it follows a simple rule. Once the slips are marked, the remainder of the book-keeping is entirely routine-work, as it merely consists in sticking in, or otherwise mechanically affixing the slips and the copies thereof, in the places indicated by the markings and rulings in the books.

The system is shown in the accompanying drawings, in which:—

Fig. 1 shows a sheet from the transaction book hereinafter referred to; Fig. 2 shows a personal ledger page. Fig. 3 shows two department ledger pages.

Two books only are required for this improved system of book-keeping, viz, (*a*) what may be called a transaction or initial general entry book, Fig. 1, and (*b*) a ledger, Figs. 2 or 3 (mechanically, if desired, these two books may be combined.) The transaction book replaces up to seven of the books ordinarily employed in book-keeping. It is of the columnar analysis type and is provided with six or seven columns, *a*, and a margin *b* on the left for portions of the slips which may extend outside the columns; also rulings *c* at the foot of each column to contain the totals of the amount in each column. These columns are of similar widths, and are headed with the markings and titles referred to above, such as:—

CH—Charges.
GP—Goods purchased.
CD—Cheques drawn.
PD—Cash paid out.
RC—Received on account.
*S—Cash sales.
TR—Transfers from one department to another (internally).

One of the slips, $d^1$, $d^2$, etc., of each entry, is suitably secured in the next available space provided in this book as shown, so that the amount in money, entered upon the slip, comes in the column with its corresponding marking. In slip $d^1$ the initial letter is GP. The slip must therefore be secured so that the amount comes under column GP (second column). In this way, though a number of slips $d^1$, $d^2$, etc., be on a page of this transaction book (Fig. 1), they are tabulated for easy addition, in classified amounts. Also all the slips appear in numerical and chronological order. Incidentally this method provides a trial balance of the accounts of the business, each time a page of the transaction book is completed and added up; an advantage that is rarely obtained—owing to the amount of work involved—in ordinary book-keeping methods.

One of each of the duplicated copies of the slips $d^1$, $d^2$, etc., is then suitably secured in the next available space on the ledger sheet or file allocated to the person or firm or company concerned with the account. On each ledger sheet there will always be two vacant spaces, one on either hand, but only one of these will be available, as the slips are only to be secured to the side which bears a similar marking at the top to that on the slip, which is one of the seven classes of markings to which reference has been made above. In slip $d^1$ the initial letter or marking is GP. The slip must therefore be secured on the ledger personal page so that the slip comes on the right hand side, as this side of the page or holder, is already marked with the similar indication—GP. From time to time, and also at the end of each financial period, these ledger pages are balanced in the usual manner adopted in the ordinary practice of book-keeping. As attention has only to be paid to the indications of the markings, no consideration need be paid as to whether the entry is a debit or credit, for it automatically appears on the correct side of the ledger page, in accordance with the accepted principles of modern book-keeping practice.

Owing to the routine work or mechanical simplicity of this improved manner of making enterings in account books, a complete analysis of the working of each department or section of the business may be kept without any further trouble than that involved in making the extra copy slip and securing the same on the proper ledger department page Fig. 3. A department ledger of this nature is of very great value to any business but in ordinary book-keeping involves considerable expenditure of time. The markings on the department pages of the ledger are on the reverse sides of the pages to that of the personal accounts, to accord with the accepted principles of standard book-keeping, whereby a personal credit becomes, on transfer, a department debit, and vice-versa. As the department sheets in this improved system of books are ready marked and ruled to accord with these principles, the affixing of the slips is the routine work of merely placing same under the corresponding markings, without the necessity of mental consideration and decision as to whether they are debit or credit items.

When a slip $d^1$, $d^2$, etc., is prepared, preferably, the personal ledger page number (say page 80) and the department ledger page number (say page 7) is written or typed on it, as well as the date, the classification mark (GP), (CH), etc., and the consecutive number (say Nos. 1—2, etc.) of the transaction. One of the copies of the slip $d^1$, etc., is secured to the original document (invoice or what-not) thus indicating that it has been dealt with, and so avoiding duplication of entry. If desired, instead of employing a separate slip $d^1$, $d^2$; a duplicate or carbon copy may be made of the entry, direct on to the document, by aid of carbon paper. The document should preferably be filed in numerical and chronological order, with all the other similar account documents. Hence in this improved system of book-keeping, there will be a complete cross reference from any one entry of an account to all other entries of the same account; for each slip, as explained above, contains in addition to the amount, the consecutive number of the transaction such as indicated by number 1 in the transaction book, which is also the number of the document in the document file, and the numbers of both the personal ledger page say 80 and department ledger page say 7, and the date.

In this improved system of accounting, the ledger is preferably of the loose-leaf type with combined alphabetical and numerical indexing, so that all accounts may be kept both in combined alphabetical and numerical order. Of course an ordinary bound ledger, specially marked and ruled, in accordance with this improved system provided with an index, and suitably guarded, could be used.

The pages of the ledger are preferably provided with tabs $f$ or indicators to facilitate reference. Also they should be ruled with spaces for the totals of the amounts on the slips and for intermediate totals and balancing.

Owing to the markings on the slips $d^1$, $d^2$, etc., the accounts can be very rapidly checked and audited; further, with this improved system, a final balance sheet can be prepared immediately at the close of the financial year, as all the accounts are bound to be up-to-date and accurate, if the slips are stuck in or otherwise mechanically affixed, as they should be, as soon as prepared.

This invention makes possible the adoption and use of adding machines and the like for complete book-keeping (which has not been possible heretofore), on a mechanical basis, as it provides a means for the keeping of a ledger on the double entry system, through the medium of slips or sheets prepared, marked and numbered in the machine, in the same manner as previously described for the preparation of these strips by hand or type-writing.

I claim:

1. In book-keeping, a transaction book ruled to leave top and bottom spaces, a left marginal column and equal entry spaces under marked columnar headings, in combination with marked sales slips suitably inscribed and then permanently secured in said book in vertical succession and horizontal selection determined by said marked headings, as and for the purpose stated.

2. In book-keeping, a ledger book having pages ruled to leave top and bottom spaces for an appropriate heading, a heading in such spaces to identify the account and the words carried forward to indicate that the totals at foot of a page are to be taken forward onto the next page, equal horizontal divisions located to the left of the total columns, separate entry slips secured in said divisions determined by said marked headings, appropriately designated totalizing and balancing central columns and right hand total column as and for the purpose stated.

RICHARD BORLASE MATTHEWS.